(12) United States Patent
Li et al.

(10) Patent No.: US 6,587,526 B1
(45) Date of Patent: Jul. 1, 2003

(54) APPARATUS AND METHOD FOR TIMING SYNCHRONIZATION IN OFDM-BASED WIRELESS SYSTEMS

(75) Inventors: Junyi Li, Matawan, NJ (US); Michaela C. Vanderveen, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/416,702

(22) Filed: Oct. 12, 1999

(51) Int. Cl.[7] .................................................. H04L 7/00
(52) U.S. Cl. ........................ 375/355; 375/347; 375/357; 375/358
(58) Field of Search ................................ 375/347, 316, 375/354, 355, 357, 358

(56) References Cited

U.S. PATENT DOCUMENTS

| | | | |
|---|---|---|---|
| 4,750,147 A | 6/1988 | Roy, III et al. | |
| 4,965,732 A | 10/1990 | Roy, III et al. | |
| 5,471,464 A | 11/1995 | Ikeda | |
| 5,506,836 A | 4/1996 | Ikeda et al. | |
| 5,748,677 A | * 5/1998 | Kumar | 375/229 |
| 5,889,759 A | 3/1999 | McGibney | |
| 6,144,711 A | * 11/2000 | Raleigh et al. | 375/346 |

* cited by examiner

*Primary Examiner*—Chi Pham
*Assistant Examiner*—Pankaj Kumar

(57) ABSTRACT

A prescribed signal transmission channel parameter is estimated by employing a unique arrangement and/or method that does not require the estimation of all the signal channel parameters. Specifically, this is realized by employing a rotational invariance arrangement or technique that utilizes either spectral, and/or temporal, and/or spatial diversity present in the wireless system to generate a single prescribed parameter of the mobile signal transmission channel. The single prescribed signal transmission channel parameter is obtained by forcing the rotational invariance arrangement or technique to yield the single largest eigenvector from a prescribed relationship of signal data vectors of the signal transmission channel. In one embodiment of the invention the prescribed parameter of the signal transmission channel is the delay that is substantially constant over the diversity, while the gain of each signal transmission channel path may vary. The estimated signal transmission channel delay is advantageously employed in a mobile station to adjust the timing alignment of the mobile signal being transmitted over the transmission channel to the base station, thereby ensuring proper positioning of the transmitted mobile signal in the optimum sampling window at the base station.

54 Claims, 2 Drawing Sheets

APPARATUS AND METHOD FOR TIMING SYNCHRONIZATION IN OFDM-BASED WIRELESS SYSTEMS

TECHNICAL FIELD

This invention relates to timing synchronization and, more particularly, to timing synchronization in wireless communications systems.

BACKGROUND OF THE INVENTION

Recently, orthogonal frequency division multiplexing (OFDM) has been applied to communications systems and, in particular, to wireless communications systems. In OFDM a plurality of frequency multiplexed relatively narrow band signals are employed to form a wide band, "high" speed radio transmission link. In such an arrangement timing synchronization is required to position the signal in an optimum sampling window and to ensure proper alignment of the phases of the plurality of narrow band signals. To this end, it is required to obtain a timing adjustment signal that is employed to adjust timing in order to obtain the properly alignment.

Indeed, in multiple access systems based on OFDM, it is critical that there be synchronous arrival of mobile user symbols at a base station. If a particular user's arriving symbols are offset in time relative to other synchronized user's arriving symbols, the result is interference to the arriving symbols of all the mobile users.

In prior arrangements, attempts have been made to generate a timing adjustment signal through the estimation of all of the signal transmission channel parameters.

One prior known arrangement for estimating signal parameters is described in U.S. Pat. No. 4,750,147 issued on Jun. 7, 1988 which is commonly referred to as "ESPRIT" (Estimation of Signal Parameters using Rotational Invariance Techniques). The ESPRIT technique is based on maximum likelihood entropy principles, or subspaces, for the estimation of sinusoid signal parameters. As such, ESPRIT cannot be directly applied to estimation of signal parameters in an OFDM system because ESPRIT is directed toward extracting all of the signal transmission channel parameters and there is insufficient data to realize this. Moreover, extracting all the signal transmission channel parameters generally requires a large amount of measurement data, which either is not available or results in significant system overhead. Indeed, in an OFDM system there are just too many parameters for all of them to be uniquely identified as is required in the prior ESPRIT arrangement.

SUMMARY OF THE INVENTION

Problems and limitations of prior known arrangements and techniques for signal transmission channel parameter estimation are overcome by employing a unique arrangement and/or method that does not require the estimation of all the signal transmission channel parameters.

Specifically, this is realized by employing a rotational invariance arrangement or technique that utilizes either spectral, and/or temporal, and/or spatial diversity present in the wireless system to generate a single prescribed parameter of the mobile signal transmission channel.

The single prescribed signal transmission channel parameter is obtained by forcing the rotational invariance arrangement or technique to yield the single largest eigenvector from a prescribed relationship of signal data vectors of the signal transmission channel.

In one embodiment of the invention the prescribed parameter of the signal transmission channel is the delay that is substantially constant over the diversity, while the gain of each signal transmission channel path may vary. The estimated signal transmission channel delay is advantageously employed in a mobile station to adjust the timing alignment of the mobile signal being transmitted over the channel to the base station, thereby ensuring proper positioning of the transmitted mobile signal in the optimum sampling window at the base station.

DETAILED DESCRIPTION

Theoretical Discussion of Problem Formulation

Figure 1:
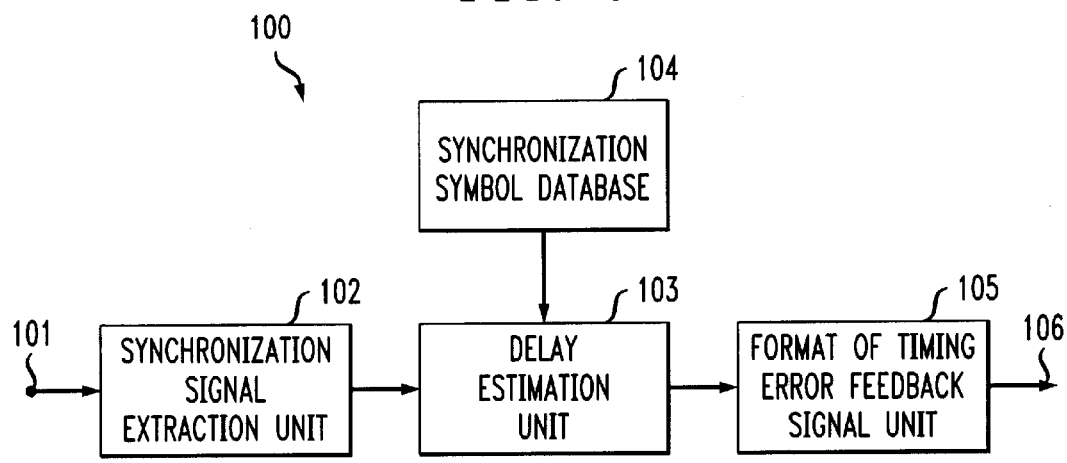
FIG. 1 shows, in simplified block diagram form, details of the timing synchronization portion of a wireless system base station including an embodiment of the invention.

It is noted that there is possible interference between same cell mobile users that can be avoided. To realize this, it is crucial that all the mobile users' symbol intervals are time-aligned. Indeed, because of multipath signal transmission, this timing control task does not reduce to simply estimating the arrival of a first signal from each of the same cell mobile users. Rather, it is necessary to estimate the time range of the signal transmission channel power-delay profile. The ultimate goal is to correctly place the channel cyclic prefix window, with no significant channel energy outside of it. Simply stated, the channel cyclic prefix window is placed to cover the signal transmission channel impulse response.

To realize timing control, a mobile station transmits a plurality of (pure) single frequency tones, i.e., carrier frequencies, for a prescribed interval to a base station. Then, the base station determines where the multipath profile is located, with the ultimate goal being the placement of the cyclic prefix. To this end, the base station needs to inform each of the mobile users a time interval by which to advance or delay transmission. A prescribed timing control interval, $\bar{\tau}+T$, is determined in advance. Note that the center frequency of the ith tone is $f_i=f_c+i\Delta$, and T is the symbol period, i.e., the period of the frequency tones. The first carrier frequency is $f_c$ and the carrier frequencies are spaced apart by $\Delta=W/N=1/\text{Thz}$, where W is the total bandwidth available to the system and N is the number of tones. Furthermore, $\bar{\tau}$ is analogous to the cyclic prefix, and in this instance is in the order of, for example, 100 μs, so that it covers propagation delays for all mobile users regardless of their distance to the serving base station. It is assumed that the signals from mobile users to be timing controlled arrive at the serving base station between time $-\bar{\tau}/2$ and $\bar{\tau}/2$, where time "0" is defined arbitrarily as the instance the sampling window starts. This relatively large cyclic prefix $\bar{\tau}$, as well as the multiple tone transmission, are what distinguish the timing control from ordinary data transfer.

The signal transmission channels are assumed to have multiple attenuated and delayed paths. To clarify, the signal transmission channel, let $\alpha_n(t), \tau_n(t)$ be the nth path complex attenuation and delay, respectively. If a mobile user transmits M pure tones, $$s(t) = \sum_{i'=1}^{M} e^{j2\pi f_{i'} t}. \tag{1}$$

Then, the signal received at the serving base station is $$r(t) = \sum_{i'=1}^{M} \sum_{n} \alpha_n(t) e^{j2\pi(f_{i'} + f_{D,n})(t - \tau_n(t))} + w(t), \tag{2}$$

where $-\bar{\tau}/2 \leq \tau_n(t) \leq \bar{\tau}/2$, and w(t) is the noise and interference, and $f_{D,n}$ the Doppler shift of each path. In the following, for simplicity of notation the time dependency is dropped of $\alpha_n(t), \tau_n(t)$ and $\theta_n(t)$.

The windowing and Discrete Fourier Transform (DFT) yield:

$$x_i = \frac{1}{T} \int_0^T r(t) e^{-j2\pi f_i t} dt \approx \sum_n \alpha_n e^{-j2\pi f_i \tau_n} + w_i, \tag{3}$$

where i=1, . . . , M. Note that the approximation results from neglecting the effect of the Doppler shift, and $w_i$ is the sampled frequency response of the noise. Since the path attenuation does not vary from tone to tone, as in the case when the total, null-to-null bandwidth of the tones is less than the coherence bandwidth of the signal transmission channel, then $$x_i = \sum_n e^{-j\omega_i \tau_n} \alpha_n + w_i, \tag{4}$$

where i=1, . . . , M and $\omega_i = 2\pi f_i$. In matrix form, the data satisfies $$\begin{bmatrix} x_1 \\ \vdots \\ x_M \end{bmatrix} = \begin{bmatrix} e^{-j\omega_1 \tau_1} & e^{-j\omega_1 \tau_2} & \cdots \\ \vdots & \vdots & \cdots \\ e^{-j\omega_M \tau_1} & e^{-j\omega_M \tau_2} & \cdots \end{bmatrix} \begin{bmatrix} \alpha_1 \\ \alpha_2 \\ \vdots \end{bmatrix} + \begin{bmatrix} w_1 \\ w_2 \\ \vdots \end{bmatrix}, \tag{5}$$

namely, $$x = Ha + w. \tag{6}$$

It is assumed that the wireless system has L diversity antennas. For example, the base station has L diversity avenues, i.e., channels. Practical values of L are small. Indeed, most current wireless systems employ two diversity antennas at each base station sector, i.e., cell. Then, L sets of data vectors x are obtained according to equation (6) above. The purpose of diversity antennas is to obtain substantially uncorrelated signal transmission channels. We have recognized that what has changed in the signal transmission channel is the path gains and not the path delays. Stated another way, the path delay is substantially constant over diversity, while the gain of each channel path may vary. Therefore, the ith tone data at the lth antenna, $X_i(l)$, becomes $$x_i(l) = \sum_n \alpha_n(l) e^{-j\omega_i \tau_n}, \tag{7}$$

where i =1, . . . , M, l=1, . . . , L, and $\alpha_n(l), w_i(l)$ are substantially uncorrelated over diversity. Now since the delay matrix H remains unchanged, then the data model is $$x(l) = Ha(l) + w(l), \tag{8}$$

where l=1, . . . , L, and $\alpha(l), w(l)$ are substantially uncorrelated over diversity.

The example described above is for spatial diversity. Spectral (frequency) and temporal (time) diversity may also be exploited. In the case of spectral diversity, L sets of tones are transmitted over the mobile signal transmission channel. The sets of tones should be separated in frequency by greater than the coherence bandwidth of the mobile signal transmission channel. To realize temporal diversity, the above noted set of tones is transmitted over the mobile signal transmission channel during L timing control intervals separated in time by greater than the coherence time of the mobile signal transmission channel. Indeed, combinations of diversity are possible, for example, when the mobile user transmits one set of tones during a timing control interval, then another set of tones in a timing control interval some time later, and the received signal is captured during each instance by two diversity antennas. Note that when employing temporal diversity, a requirement is that the transmission path delays stay substantially constant during the two timing control intervals.

Preferred Embodiment(s)

FIG. 1 shows, in simplified block diagram form, details of the timing synchronization portion of a wireless system base station including an embodiment of the invention. Specifically, a received signal from a user mobile station 200 (FIG. 2), as indicated in Equation (2) and described above, is supplied to input terminal 101 and, then, to synchronization signal extraction unit 102. Unit 102 includes an optimum sampling window, as described above, and extracts the timing synchronization signal in well known fashion. The extracted signal is down-converted to yield a continuous time down converted and windowed signal. This signal is supplied to delay estimation unit 103. In certain applications the received signal may be modulated by synchronization symbols assigned to the particular user mobile station. In such an instance, it is necessary to remove the synchronization symbols from the received signal. To this end, the assigned symbols for the particular received signal are supplied from synchronization symbol database 104 to delay estimation unit 103 where they are used to remove the synchronization symbols from the received signal, as described below in conjunction with FIG. 3. Note if or when the mobile user station 200 is transmitting only pure tones, no synchronization symbols are required from database 104. Indeed, in certain applications synchronization symbol database 104 may not be used at all or even included in the implementation. Delay estimation unit 103 generates a delay estimate $\tau$ that is supplied as an output as signal timing control parameter $\hat{\tau}$ that, in turn, is supplied to format of timing error feedback signal unit 105. It is noted that the estimated delay parameter of the signal transmission channel can be either positive or negative. When the delay is negative, a timing control signal is generated having a corresponding positive adjustment interval, and when the delay is positive, a timing control signal is generated having a corresponding negative adjustment interval. Then, unit 105 formats the signal, including the synchronization timing control signal, into a timing error feedback signal to be transmitted to the particular mobile user station 200. The timing error feedback signal indicates the time interval that the transmit symbol clock has to be either advanced or delayed. Thereafter, the formatted signal perhaps in the form of a message is supplied as an output via output terminal 106.

Figure 2:
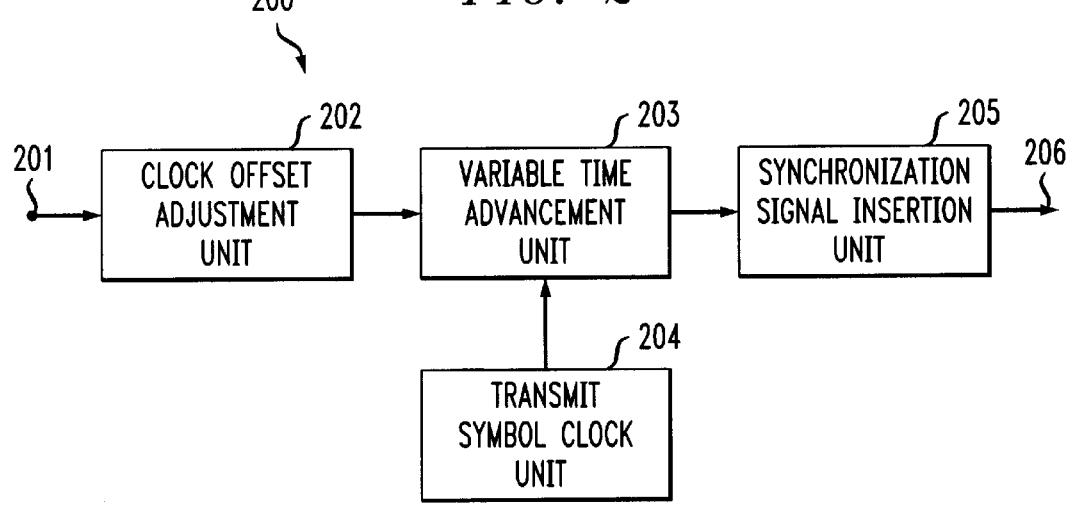
FIG. 2 shows, in simplified block diagram form, details of the timing synchronization portion of a wireless system mobile station useful in describing an embodiment of the invention.

FIG. 2 shows, in simplified block diagram form, details of the timing synchronization portion of a wireless system mobile user station 200 useful in describing an embodiment of the invention. A received timing error feedback signal from base station 100 is supplied via input terminal 201 to clock offset adjustment unit 202. Unit 202 extracts the transmit offset value from the received timing error feedback signal in known fashion. In one example, the interval may be in microseconds that the transmit clock has to be advanced or delayed. If the offset value is in a message the interval is typically expressed in time increments. The transmit clock offset is supplied to variable time adjustment unit 203. Also supplied to variable time adjustment unit 203 is the transmit symbol clock from transmit symbol clock unit 204. Variable time adjustment unit 203, in response to the transmit clock offset, adjusts the transmit clock accordingly, in well known fashion. As indicated above the transmit clock is advanced or delayed by the transmit offset interval so that the transmitted signal from user mobile user station 200 will be substantially centered in the optimum sampling window in base station 100. The adjusted transmit symbol clock is supplied to synchronization signal insertion unit 205 where it is used to properly insert the synchronization signal for transmission to the base station in any other current data signal.

Figure 3:
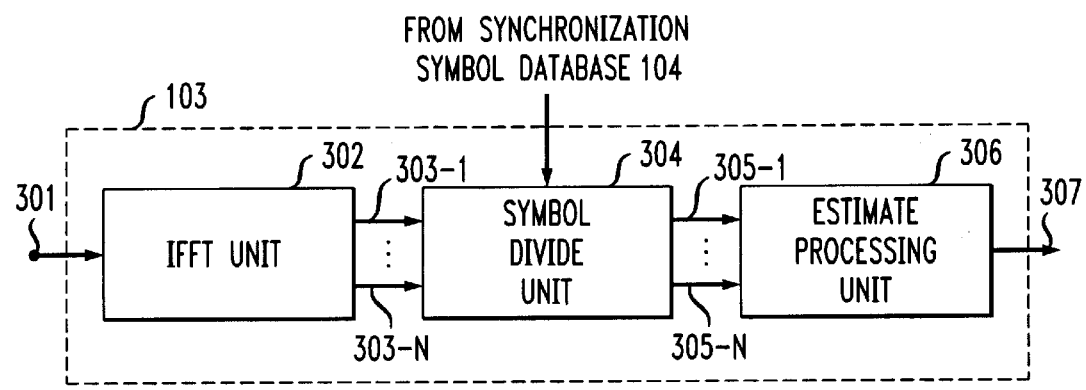
FIG. 3 shows, in simplified block diagram form, details of the delay estimation unit of FIG. 1 including an embodiment of the invention.

FIG. 3 shows, in simplified block diagram form, details of the delay estimation unit 103 of FIG. 1 including an embodiment of the invention. The continuous-time and down-converted and windowed signal synchronization signal extraction unit 102 (FIG. 1) is supplied via input terminal 301 to Inverse Fast Fourier Transform (IFFT) unit 302. Unit 302 yields a set of complex values 303-1 through 301-N, one for each simultaneously received tone or sinusoid. Thus, N tones or sinusoids are received at base station 100. Complex values 303-1 through 303-N are simultaneously supplied to symbol divide unit 304. Also supplied to unit 304 are assigned symbols from synchronization symbol database 104 (FIG. 1). Each of the complex values 303-1 through 303-N is equal to the product of the frequency response of the signal transmission channel (sampled at the frequency/tone), and the assigned data symbol plus any noise introduced by transmit channel and/or by the transmitter and receiver. Unit 304 removes the assigned symbols by dividing them out of the complex values 303-1 through 303-N. The resulting output from unit 304 are noisy channel frequency response samples 305-1 through 305-N. Note that in some systems pure tones are transmitted and, therefore, there is no need to remove any symbols form the complex values and unit 304 is not necessary. Channel frequency response samples 305-1 through 305-N are supplied 30 to estimate processing unit 306. Unit 306 may be for example a digital signal processor (DSP). Estimate processing unit 306 utilizes channel frequency response samples 305-1 through 305-N, as described below in FIG. 4, to generate the single timing delay estimate τ that is supplied as an output via terminal 307. Note that if the mobile station 200 is transmitting other tones shortly after the simultaneously transmitted tones or sinusoids employed above, as part of the same synchronization interval, other tones are also processed in the same fashion as the channel frequency response samples 305-1 through 305-N above, and the aggregate data is supplied concurrently to estimate processing unit 306. Similarly, if the base station 100 is receiving data simultaneously on two or more antennas, this received data is also processed in a similar fashion as described above and, then, supplied to estimate processing unit 306.

Figure 4:
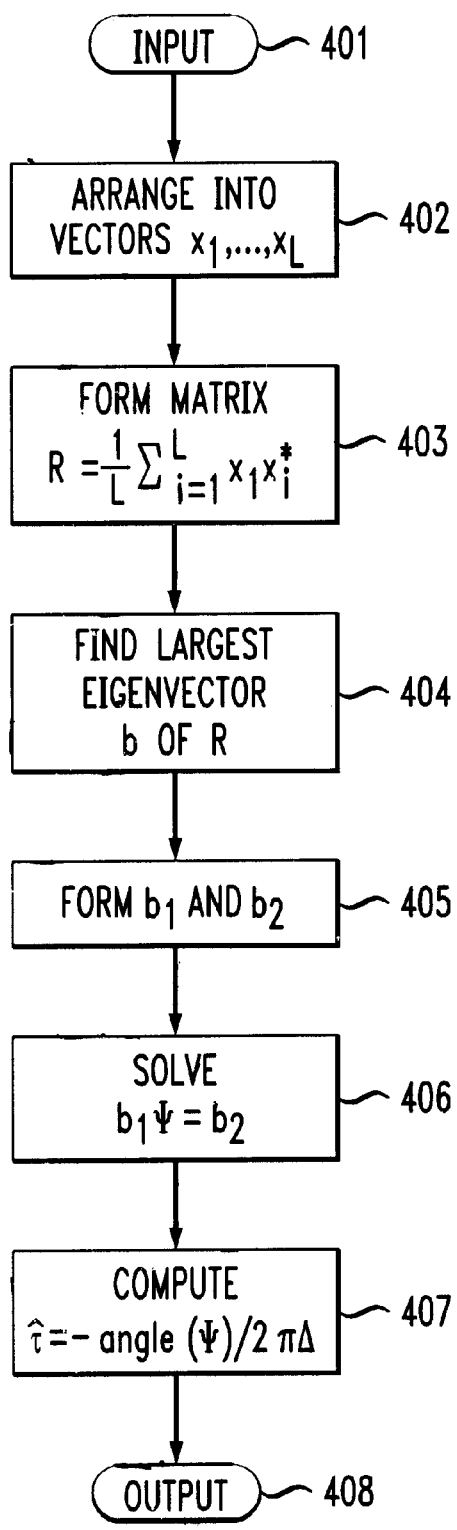
FIG. 4 is a flow chart illustrating the steps of the inventive delay estimation process employed in the estimate processing unit of FIG. 3.

FIG. 4 is a flow chart illustrating the steps of the inventive delay estimation process employed in the estimate processing unit 306 of FIG. 3.

Complex values, i.e., channel frequency response samples, 305-1 through 305-N are N complex scalars that are the baseband signal transmission channel estimates. These estimates are grouped according to the coherence bandwidth M of the signal transmission channel and the diversity order such that N=ML. The coherence bandwidth is a relatively loosely defined quantity, indicating that the signal transmission channel frequency response is strongly correlated across M contiguous tones, or MΔHz, where Δ is the tone spacing in Hz. The diversity order is the number of such sets of M contiguous tones that are sufficiently decorrelated among them. As indicated above the diversity can be spatial, i.e., data is obtained from widely separated antennas, temporal, i.e., data is obtained from transmissions at different points in time, or spectral, i.e., data is obtained from transmissions in different parts of the transmission frequency band. Then, each diversity set contains M tones, and can be thought as an M-dimensional vector $x_i$, where i=1, . . ., L and L is the order of diversity, as described above. By way of an example, if the signal transmission channel is deemed to be substantially flat in a frequency band containing M contiguous tones, then obtained from two diversity antennas are two M-long vectors $x_1$ and $x_2$, which are substantially uncorrelated. Note that diversity L=2. Further, note that not all of the L $x_i$ vectors need to be mutually decorrelated or independent in order for the proper operation of estimate processing unit 306.

Referring now to the flowchart of FIG. 4, the delay estimation process in started in step 401 by inputting the complex scalars 305-1 through 305-N. The, step 402 causes the complex scalars to be arranged into vectors $x_1, \ldots, X_L$ as described above. Thereafter, step 403 forms the autocorrelation matrix $$R = \frac{1}{L}\sum_{i=1}^{L} x_i x_i^*,$$

where "*" indicates the complex conjugate. Step 404 causes the computation of the eigenvector of matrix R of step 403 corresponding to the single largest eigenvalue, in accordance with the invention. This is realized, for example, by employing the so-called power method. See for example a book authored by G. Golub and C. Van Loan entitled *Matrix Computations*, The John Hopkins University Press, 1989. The found largest single eigenvector is denoted "b" of R. In step 405, vectors $b_1$ and $b_2$ are formed. This is realized by extracting the first M−K entries of vector b and denoting the resulting vector $b_1$, and similarly extracting the last M−K entries of b and denoting the resulting vector $b_2$. "K" is an implementation dependent overlap parameter, which is an integer chosen to be greater than or equal to "1" and strictly less than M/2. Typically, K is chosen such that K=1. Step 406 causes a complex scalar ψ to be found that exactly or approximately satisfies $b_1\psi=b_2$. In one example, this is realized by employing the least squares method or more appropriately the total least squares method also described in the *Matrix Computation* book noted above. Finally, step 407 causes the delay estimate $\hat{\tau}$ is obtained. This is realized by dividing the angle of $\psi$ by $-2\pi\Delta$ where $\Delta$ is the tone spacing. In this example, the "angle" of a complex number $\psi$ is $\theta$, a number between $-\pi$ and $\pi$, where $\psi=re^{j\theta}$, r is the magnitude of $\psi$ and $j=\sqrt{-1}$. Then, in step 408 delay estimate $\tau$ is supplied as an output as timing control signal $\hat{\tau}$.

The above-described methods and apparatus are, of course, merely illustrative of the principles of the invention. Indeed, numerous other methods or apparatus may be devised by those skilled in the art without departing from the spirit and scope of the invention.

What is claimed is:

1. Apparatus for use in a wireless communications system for generating a timing control signal comprising:
    a receiver for receiving a signal including a plurality of tones from at least one mobile station;
    a first prescribed processor supplied with Wd received tones for generating a corresponding plurality of complex scalars of the mobile user transmission channel; and
    an estimate processor supplied with said plurality of complex scalars for generating a single prescribed parameter representative of delay characteristics of said mobile user transmission channel and for utilizing said single prescribed parameter representative of delay characteristics in accordance with prescribed criteria to generate said timing control signal,
    wherein said timing control signal is to be transmitted to said mobile unit where it ensures proper positioning of a transmitted mobile signal in the optimum sampling window at a base station by being responsive to said timing control signal to controllably delay or advance a transmit symbol clock in said mobile unit.

2. The invention as defined in claim 1 wherein said first prescribed processor includes apparatus for providing a prescribed sampling window through which said received tones are passed through.

3. The invention as defined in claim 1 wherein said first prescribed processor further includes a prescribed transform function unit for generating said plurality of complex scalars.

4. The invention as defined in claim 3 wherein said prescribed transform function is an inverse discrete Fourier transform.

5. The invention as defined in claim 3 wherein said prescribed transform function is an inverse fast Fourier transform.

6. The invention as defined in claim 3 wherein each of said plurality of complex scalars is a channel frequency response sample.

7. The invention as defined in claim 6 wherein said estimate processor further includes apparatus for arranging said channel frequency response samples into a plurality of prescribed vectors.

8. The invention as defined in claim 7 wherein said prescribed vectors are over a prescribed diversity.

9. The invention as defined in claim 8 wherein said diversity is at least two (2).

10. The invention as defined in claim 8 wherein said estimate processor further includes apparatus for obtaining an autocorrelation matrix of said prescribed vectors.

11. The invention as defined in claim 10 wherein said prescribed parameter representation of delay charcteristics is the largest eigenvector of said autocorrelation matrix.

12. The invention as defined in claim 11 wherein said single largest eigenvector is obtained by employing a power method solution of said autocorrelation matrix.

13. The invention as defined in claim 11 wherein said prescribed criteria includes forming a first prescribed vector ($b_1$) and a second prescribed vector ($b_2$) from said single largest eigenvector, finding a prescribed complex scalar ($\psi$) that satisfies a function $b_1\psi=b_2$, finding an angle ($\theta$) of $\psi$ and finding the timing control signal $\hat{\tau}$, where $\hat{\tau}=-\theta/2\pi\Delta$ and $\Delta$ is the received tone spacing in Hz.

14. The invention as defined in claim 13 wherein said vector $b_1$ is obtained by extracting the first M−K entries of said single largest eigenvector, and said vector $b_2$ is obtained by extracting the last M−K entries of said single largest eigenvector, where, M is a number of contiguous tones in a diversity set and K is an integer chosen to be greater than or equal to "1" and strictly less than M/2.

15. The invention as defined in claim 13 wherein said complex scalar ($\psi$) is obtaining by employing a total least squares technique.

16. The invention as defined in claim 14 wherein said timing control signal is a delay estimate.

17. The invention as defined in claim 1 wherein said received tones are modulated by synchronization symbols assigned to said at least one mobile station, and wherein said estimation processor includes apparatus for removing said synchronization symbols from said transmission coefficients.

18. Apparatus for use in adjusting timing in a wireless communication system including a base station and at least one mobile station comprising:
    in said base station, a receiver for receiving a signal including a plurality of tones from at least one mobile station,
    a first prescribed processor supplied with said received tones for generating a corresponding plurality of complex scalars of the mobile user transmission channel, and
    an estimate processor supplied with said plurality of complex scalars for generating a single prescribed parameter representative of delay characteristics of said mobile user transmission channel and for utilizing said single prescribed parameter representative of delay characteristics in accordance with prescribed criteria to generate said timing control signal; and
    in said mobile station, an adjustable time transmit symbol clock responsive to said timing control signal received from said base station for controllably delaying or advancing said transmit symbol clock,
    wherein proper positioning of a transmitted mobile signal is ensured in the optimum sampling window at a base station by being responsive to said timing control signal to controllably delay or advance said transmit symbol clock.

19. The invention as defined in claim 18 wherein said first prescribed processor further includes a prescribed transform function unit for generating said plurality of complex scalars.

20. The invention as in claim 19 wherein said prescribed prescribed transform function is an inverse discrete Fourier transform.

21. The invention as defined in claim 19 wherein said prescribed transform function is an inverse fast Fourier transform.

22. The invention as defined in claim 19 wherein each of said plurality of complex scalars is a channel frequency response sample.

23. The invention as defined in claim 22 wherein said estimate processor further includes apparatus for arranging said channel frequency response samples into a plurality of prescribed vectors.

24. The invention as defined in claim 23 wherein said prescribed vectors are over a prescribed diversity.

25. The invention as defined in claim 24 herein said diversity is at least two (2).

26. The invention as defined in claim 24 wherein said estimate processor further includes apparatus for obtaining an autocorrelation matrix of said prescribed vectors.

27. The invention as defined in claim 26 wherein said single prescribed parameter representation of delay characteristics is the largest eignvector of said autocorrelation matrix.

28. The invention as defined in claim 27 wherein said single largest eigenvector is obtained by employing a power method solution of said autocorrelation matrix.

29. The invention as defined in claim 27 wherein said prescribed criteria includes forming a first prescribed vector ($b_1$) and a second prescribed vector ($b_2$) from said single largest eigenvector, finding a prescribed complex scalar ($\psi$) that satisfies a function $b_1\psi=b_2$, finding an angle ($\theta$) of $\psi$ and finding the timing control signal $\tau$, where $\tau=-\theta/2\pi\Delta$ and $\Delta$ is the received tone spacing in Hz.

30. The invention as defined in claim 18 wherein said estimation processor includes apparatus for removing said synchronization symbols from said transmission coefficients.

31. Apparatus for use in a wireless communications system for generating a timing control signal comprising:
  means for receiving a signal including a plurality of tones from at least one mobile station;
  first means supplied with said received tones for generating a corresponding plurality of complex scalars of the mobile user transmission channel; and
  second means supplied with said plurality of complex scalars for generating a single prescribed parameter representative of delay characteristics of said mobile user transmission channel and for utilizing said single prescribed parameter representative of delay characteristics in accordance with prescribed criteria to generate said timing control signal,
  wherein said timing control signal is to be trasmitted to said mobile unit where it ensures proper positioning of a transmitted mobile signal in the optimum sampling window at a base station by being responsive to said timing control signal to controllably delay or advance a transmit symbol clock in said mobile unit.

32. The invention as defined in claim 31 wherein said first means includes means for performing a prescribed transform function on said received tones to generate said plurality of complex scalars.

33. The invention as defined in claim 32 wherein said means for performing a prescribed transform function includes means for performing an inverse discrete Fourier transform function.

34. The invention as defined in claim 32 wherein said means for performing a prescribed transform function includes means for performing an inverse fast Fourier transform function.

35. The invention as defined in claim 32 wherein each of said plurality of complex scalars is a channel frequency response sample.

36. The invention as defined in claim 35 wherein said second means includes means for arranging said channel frequency response samples into a plurality of prescribed vectors.

37. The invention as defined in claim 36 wherein said prescribed vectors are over a prescribed diversity.

38. The invention as defined in claim 37 wherein said diversity is at least two (2).

39. The invention as defined in claim 37 wherein said second means further includes means for obtaining an autocorrelation matrix of said prescribed vectors.

40. The invention as defined in claim 39 wherein said single prescribed parameter representative of delay characteristics is the largest eigenvector of said autocorrelation matrix.

41. The invention as defined in claim 40 wherein said single largest eigenvector is obtained by employing a power method solution of said autocorrelation matrix.

42. The invention as defined in claim 40 wherein said prescribed criteria includes forming a first prescribed vector ($b_1$) and at least a second prescribed vector ($b_2$) from said single largest eigenvector, finding a prescribed complex scalar ($\psi$) that satisfies a function $b_1\psi=b_2$, finding an angle ($\theta$) of $\psi$ and finding the timing control signal $\tau$, where $\tau=-\theta/\Delta$ and $\Delta$ is the received tone spacing in Hz.

43. A method for use in a wireless communications system for generating a timing control signal comprising the steps of:
  receiving a signal including a plurality of tones from at least one mobile station;
  in response to said received tones, generating a corresponding plurality of complex scalars of the mobile user transmission channel; and
  in response to said plurality of complex scalars, generating a single prescribed parameter representative of delay characteristics of said mobile user transmission channel and for utilizing said single prescribed parameter representative of delay characteristics in accordance with prescribed criteria to generate said timing control signal,
  wherein said timing control signal is to be transmitted to said mobile unit where it ensures proper positioning of a transmitted mobile signal in the optimum sampling window at a base station by being responsive to said timing control signal to controllably delay or advance a transmit symbol clock in said unit.

44. The method as defined in claim 43 wherein said step of generating complex scalars includes a step of performing a prescribed transform function on said received tones to generate said plurality of complex scalars.

45. The method of claim 44 wherein said prescribed transform function is an inverse discrete Fourier transform function.

46. The method of claim 44 wherein said prescribed transform function is an inverse fast Fourier transform function.

47. The method as defined in claim 44 wherein each of said plurality of complex scalars is a channel frequency response sample.

48. The method as defined in claim 47 further including a step of arranging said channel frequency response samples into a plurality of prescribed vectors.

49. The method as defined in claim 48 wherein said prescribed vectors are over a prescribed diversity.

50. The method as defined in claim 49 wherein said diversity is at least two (2).

51. The method as defined in claim 49 further including a step of obtaining an autocorrelation matrix of said prescribed vectors.

52. The method as defined in claim 51 wherein single prescribed parameter representative of delay characteristics is the largest eigenvector of said autocorrelation matrix.

53. The method as defined in claim 51 further including a step of wherein said single largest eigenvector is obtained by employing a power method solution of said autocorrelation matrix.

54. The method as defined in claim 51 wherein said prescribed criteria includes the steps of forming a first prescribed vector ($b_1$) and at least a second prescribed vector ($b_2$) from said single largest eigenvector, finding a prescribed complex scalar ($\psi$) that satisfies a function $b_1\psi=b_2$, finding an angle ($\theta$) of $\psi$ and finding the timing control signal $\hat{\tau}$, where $\hat{\tau}=-\theta/2\pi\Delta$ and $\Delta$ is the received tone spacing in Hz.

* * * * *